United States Patent
Maeda

(10) Patent No.: US 10,793,467 B2
(45) Date of Patent: Oct. 6, 2020

(54) CRYSTALLIZED GLASS SEALING MATERIAL

(71) Applicant: NIHON YAMAMURA GLASS CO., LTD., Amagasaki-shi, Hyogo (JP)

(72) Inventor: Kozo Maeda, Hyogo (JP)

(73) Assignee: NIHON YAMAMURA GLASS CO., LTD., Hyogo (JP)

( * ) Notice: Subject to any disclaimer, the term of this patent is extended or adjusted under 35 U.S.C. 154(b) by 0 days.

(21) Appl. No.: 16/339,611

(22) PCT Filed: Oct. 5, 2017

(86) PCT No.: PCT/JP2017/036230
§ 371 (c)(1),
(2) Date: Apr. 4, 2019

(87) PCT Pub. No.: WO2018/066635
PCT Pub. Date: Apr. 12, 2018

(65) Prior Publication Data
US 2020/0048141 A1    Feb. 13, 2020

(30) Foreign Application Priority Data
Oct. 7, 2016 (JP) .................. 2016-198689

(51) Int. Cl.
| | | |
|---|---|---|
| *C03C 8/24* | (2006.01) | |
| *C03C 10/00* | (2006.01) | |
| *C03C 8/02* | (2006.01) | |
| *C03C 8/04* | (2006.01) | |
| *H01M 8/0282* | (2016.01) | |
| *H01M 8/124* | (2016.01) | |

(52) U.S. Cl.
CPC ............ *C03C 8/24* (2013.01); *C03C 8/02* (2013.01); *C03C 8/04* (2013.01); *C03C 10/00* (2013.01); *H01M 8/0282* (2013.01); *C03C 2205/00* (2013.01); *H01M 2008/1293* (2013.01)

(58) Field of Classification Search
CPC ....................................................... C03C 8/24
See application file for complete search history.

(56) References Cited

U.S. PATENT DOCUMENTS

| | | | | |
|---|---|---|---|---|
| 8,999,870 B2 * | 4/2015 | Goedeke | ............... | C03C 3/095 501/2 |
| 9,790,123 B2 * | 10/2017 | Maeda | ............... | C03C 8/24 |
| 2013/0272774 A1 | 10/2013 | Goedeke et al. | | |
| 2015/0031524 A1* | 1/2015 | Takayama | ............... | C03C 8/24 501/14 |
| 2016/0236967 A1 | 8/2016 | Maeda et al. | | |

FOREIGN PATENT DOCUMENTS

| | | |
|---|---|---|
| JP | 2012-162445 | 8/2012 |
| JP | 2012-519149 | 8/2012 |
| JP | 2013-203627 | 10/2013 |
| JP | 2013-220990 | 10/2013 |
| JP | 2013-241323 | 12/2013 |
| JP | 2014-156377 | 8/2014 |
| WO | 2011/105519 | 9/2011 |
| WO | 2015/046195 | 4/2015 |

OTHER PUBLICATIONS

International Search Report issued in International Patent Application No. PCT/JP2017/036230, dated Dec. 26, 2017, 5 pages.
Philippe Courtial, et al., "A partial molar volume for La2O3 in silicate melts", Journal of Non-Crystalline Solids, Jan. 2006, vol. 352, pp. 304-314.

* cited by examiner

*Primary Examiner* — Karl E Group
(74) *Attorney, Agent, or Firm* — Hamre, Schumann, Mueller & Larson, P.C.

(57) ABSTRACT

Disclosed is a sealing glass composition that turns, when fired at a temperature of 900-1150° C., into a crystallized glass having a thermal expansion coefficient of 80-110× $10^{-7}$/° C. in the range of 50-850° C. The composition is substantially free of both boron oxide and barium oxide, and comprises $SiO_2$: 43-53 mol %, CaO: 12-33 mol %, MgO: 12-33 mol %, $La_2O_3$: 1-7 mol %, and ZnO: 0-4.5 mol %.

13 Claims, No Drawings

CRYSTALLIZED GLASS SEALING MATERIAL

TECHNICAL FIELD

The present invention relates to a glass composition suitable for sealing or jointing two metals, two ceramics, or a metal and a ceramic, and more specifically to a sealing glass composition to be used as a sealant for jointing each cell and metal parts to which the cell is attached, or sealing between metal parts, of solid oxide fuel cells (SOFC), or as a sealant for exhaust gas sensors or temperature sensors.

BACKGROUND ART

As it is exposed to high temperatures such as 600-800° C. for an extended period of time, a sealant for solid oxide fuel cells (SOFC) must have a performance that it will not degenerate or melt even after a long-time exposure to such high temperatures, and thus crystallizing glass has been proposed. Further, in order seal between a metal and a ceramic, flowability of such a glass during a firing step has been required, as well as its matching in thermal expansion coefficient with the members jointed by it. Furthermore, a high heat resistance to temperatures of 1000° C. or over is also required as a sealant for use in exhaustion gas sensors.

Meanwhile, for their flowability and crystallization capacity, many of crystallizing glass sealants so far developed for SOFC contain $B_2O_3$ (Patent Documents 1 and 2). However, it has been known that $B_2O_3$-containing crystallizing glass vaporize $B_2O_3$ when kept at high temperatures, which would cause problems of contamination of electrodes with evaporated $B_2O_3$ in solid oxide fuel cells (SOFC). Therefore, there is a need for a sealant that is free of evaporable ingredients, such as $B_2O_3$, in particular.

Although some types of $B_2O_3$-free glass have been developed (Patent Documents 3, 4, 5), they have drawbacks such as insufficient crystallization because of BaO contained, or melting of once precipitated crystal phase when undergoing heat treatment at high temperatures.

Further, with those disclosed in Patent Documents 3 and 4 above, there is also a problem that they are rather likely to have a smaller thermal expansion coefficient than the parts (metal, ceramic) which they joint, because they further contain ZnO at 5 mol % or more.

Furthermore, temperature sensor devices attached to the exhaust system for engines of automobiles or the like are sealed with a glass sealant to prevent alteration in their performance. A performance that the glass is required to possess in those cases, however, is that it does not deform under a high temperature environment (e.g., maximum temperature of 1050° C.), i.e., a heat resistance at 1050° C.

PRIOR ART DOCUMENTS

Patent Documents

[Patent Document 1] JP2012-519149 A
[Patent Document 2] JP2013-203627 A
[Patent Document 3] JP2013-241323 A
[Patent Document 4] JP2014-156377 A
[Patent Document 5] JP2012-162445 A

SUMMARY OF INVENTION

Technical Problem

Against the above background, the objective of the present invention is to provide a composition which is substantially free of both $B_2O_3$ and BaO, and has a capacity to turn into such a crystallized glass when fired at 900° C. or over that can be used at high temperatures of 950° C. or over.

Solution to Problem

As a result of intense studies to solve the problem mentioned above, the present inventor found that powder of a $SiO_2$—CaO—MgO—$La_2O_3$-based glass composition, provided that the composition falls within a certain range with regard to its ingredients, can turn into a crystallized glass when fired at 900-1150° C. having a thermal expansion coefficient compatible with metal and ceramic, i.e., 80-110× $10^{-7}$/° C. (50-850° C.), and completed the present invention after further studies. Thus, the present invention provides what follows.

1. A sealing glass composition substantially free of both boron oxide and barium oxide, comprising

| | |
|---|---|
| $SiO_2$ | 43-53 mol %, |
| CaO | 12-33 mol %, |
| MgO | 12-33 mol %, |
| $La_2O_3$ | 1-7 mol %, and |
| ZnO | 0-4.5 mol %, | wherein the composition turns, when fired at a temperature of 900-1150° C., into a crystallized glass having a thermal expansion coefficient of 80-110×$10^{-7}$/° C. at a temperature in the range of 50-850° C.

2. The sealing glass composition substantially free of both boron oxide and barium oxide according to 1 above, comprising

| | |
|---|---|
| $SiO_2$ | 43-53 mol %, |
| CaO | 12-31 mol %, |
| MgO | 12-31 mol %, |
| $La_2O_3$ | 3-5 mol %, and |
| ZnO | 1-4.5 mol %, | wherein the composition turns, when fired at a temperature of 900-1150° C., into a crystallized glass having a thermal expansion coefficient of 80-110×$10^{-7}$/° C. at a temperature in the range of 50-850° C.

3. The sealing glass composition substantially free of both boron oxide and barium oxide according to 1 or 2 above, comprising

| | |
|---|---|
| $SiO_2$ | 45-50 mol %, |
| CaO | 12-31 mol %, |
| MgO | 12-31 mol %, |
| $La_2O_3$ | 3-5 mol %, and |
| ZnO | 2.5-4.5 mol %, | wherein the composition turns, when fired at a temperature of 900-1150° C., into a crystallized glass having a thermal expansion coefficient of 80-110×$10^{-7}$/° C. at a temperature in the range of 50-850° C.

4. The sealing glass composition according to one of 1 to 3 above, further comprising $Al_2O_3$ at not more than 4 mol %.

5. The sealing glass composition according to one of 1 to 4 above, further comprising one of more compounds selected from the group consisting of $Y_2O_3$, $Yb_2O_3$, and $CeO_2$ in their total amount of not more than 2 mol %.

6. The sealing glass composition according to one of 1 to 5 above, further comprising one more of compounds selected from the group consisting of $TiO_2$ and $ZrO_2$ in their total amount of not more than 2 mol %.

7. The sealing glass composition according to one of 1 to 6 above, in the form of powder.

8. The sealing glass composition according to 7 above, wherein the mean particle size of the powder is 2-10 μm.

9. The sealing glass composition according to 7 or 8 above, further comprising a ceramic filler.

10. The sealing glass composition consisting of a pressed powder compact of the powder according to one of 7 to 9 above.

11. The sealing glass composition according to one of 7 to 9 above, containing a solvent and an organic binder, and in the form of paste or sheet.

12. Solid oxide fuel cells sealed with a fired body of the sealing glass composition according to one of 7 to 11 above.

13. A method of producing a sealing glass composition, wherein the composition turns, when fired in the form of powder at a temperature of 900-1150° C., into a crystallized glass exhibiting a thermal expansion coefficient of 80-110×$10^{-7}$/° C. at a temperature in the range of 50-850° C., wherein the method comprises the steps of providing and mixing raw materials so that composition is substantially free of both boron oxide and barium oxide, and comprises

| | |
|---|---|
| $SiO_2$ | 43-53 mol %, |
| CaO | 12-33 mol %, |
| MgO | 12-33 mol %, |
| $La_2O_3$ | 1-7 mol %, and |
| ZnO | 0-4.5 mol %, and | heating the raw materials into a melt, and cooling the melt to let the melt solidify.

Effects of Invention

The present invention defined above enables provision of a powder of glass composition without substantial inclusion of either $B_2O_3$ or BaO and having a property to exhibit flowability when crystallization is taking place by filing and to turn into a crystallized glass after completion of crystallization. Thus, the crystallizing glass composition according to the present invention can be used as a sealant for such positions where sealing is needed between a metal and a ceramic, a metal and a metal, or a ceramic and a ceramic that are used at high temperatures (e.g., sealing positions of solid oxide fuel cells or exhaust gas sensors). As it will neither lose its electrical insulation property even after exposed to such high temperatures as 700-1000° C. for an extended period of time, nor undergo reduction of its viscosity at such high temperatures, the composition applied to sealing positions as a sealant would increase the durability of electrical insulation property and sealing property of those positions.

DESCRIPTION OF EMBODIMENTS

The composition of the present invention is a sealing glass composition that turns, when fired in powder form at 900-1150° C., into a crystallized glass exhibiting a thermal expansion coefficient of 80-110×$10^{-7}$/° C. at a temperature in the range of 50-850° C., and the composition can be produced by a method comprising the steps of providing and mixing raw materials so that composition is substantially free of both boron oxide and barium oxide, and comprises

| | |
|---|---|
| $SiO_2$ | 43-53 mol %, |
| CaO | 12-33 mol %, |
| MgO | 12-33 mol %, |
| $La_2O_3$ | 1-7 mol %, and |
| ZnO | 0-4.5 mol %, and | heating the raw materials into a melt, and cooling the melt to let the melt solidify.

$SiO_2$, an oxide as a glass network former, is preferably contained in a range of from 43 to 53 mol % in the composition according to the present invention. If the content of $SiO_2$ is less than 43 mol %, there is a possibility that the composition of the present invention might fail to produce a glass, or might give a poorly formed glass even if a glass is obtained. Further, it is undesirable that its content exceeds 53 mol %, because that entails a possibility that too high a crystallization temperature could result, or insufficient crystallization could take place, giving instability to the seal. Considering glass forming property, softening temperature, and the like, the content of $SiO_2$ is more preferably 45-50 mol %.

In the composition according to the present invention, CaO is an ingredient which lowers the melting temperature during glass production, and also lowers the viscosity of the melt, as well as an ingredient that induces crystallization during firing of the glass composition of the present invention, and it is contained preferably in the range of 12-33 mol %. If the content of CaO is less than 12 mol %, there is a possibility that crystallization might fail to occur during firing of the glass composition of the present invention, and temperatures required for melting the glass in production would shift to a higher region, both of which are undesirable. Further, if its content exceeds 33 mol %, the composition of the present invention would not give a glass or the temperatures at which crystallization takes place would fall excessively, either of which is undesirable. It is also important that the content of CaO is within the above ranges in connection to various properties such as flowability of the glass composition during firing, and the thermal expansion coefficient of the crystalized glass produced through firing. Considering making properties such as glass forming property, crystallization temperature and the like more suitable to the objective of the present invention, the content of CaO is more preferably 12-31 mol %, still more preferably 14-28 mol % from the viewpoint of improving further the properties such as flowability during firing of the glass composition of the present invention, and particularly preferably 21-28 mol %.

In the composition of the present invention, MgO is an ingredient which lowers the glass melting temperature during production, and also lowers the viscosity of the melt, as well as an ingredient that induces crystallization during firing of the glass composition of the present invention, and it is preferably contained in the range of 12-33 mol %. If the content of MgO is less than 12 mol %, there is a possibility that crystallization might fail to take place during firing of the glass composition of the present invention, and temperatures required for melting the glass in production would shift to a higher region, both of which are undesirable. Further, if its content exceeds 33 mol %, the composition of the present invention could not give a glass or the temperature at which crystallization takes place would fall excessively, both of which are undesirable. It is alto important that the content of MgO is within the above ranges in connection to various properties like the thermal expansion coefficient of a crystallized glass produced by firing. The content of MgO is more preferably 12-31 mol % considering making properties such as glass forming property, crystallization temperature and the like more suitable to the objective of the present invention, still more preferably 14-28 mol % from the viewpoint of improving further the properties such as flowability during firing of the glass composition of the present invention, and particularly preferably 14-20 mol %.

Considering flowability during firing of the composition of the present invention, thermal expansion coefficient after crystallization, and glass forming property comprehensively, the total content of CaO and MgO is preferably 35-54 mol %, and more preferably 35-46 mol %.

In the present invention, $La_2O_3$ is an ingredient that increases flowability of the composition during firing, and also an ingredient usable to adjust crystallization starting temperature, and is preferably contained in the range of 1-7 mol %. If the content of $La_2O_3$ is less than 1 mol %, there is a possibility that it might fail to improve flowability, whereas if it exceeds 7 mol %, the melting temperature during glass production might rise too high, or some of it could remain undissolved in the melt, both of which are undesirable. Considering flowability and solubility, the content of $La_2O_3$ is more preferably 3-5 mol %.

Though it is not an essential ingredient of the present invention, ZnO is an ingredient which is effective in lowering the softening point and increasing flowability of the composition during sealing, and it is preferably contained in the range of 0-4.5 mol %. Even if the content of ZnO exceeds 4.5 mol %, glass is obtained, but the thermal expansion coefficient of the crystallized glass produced by firing such a glass composition could increase only insufficiently. Considering flowability during firing of the composition, softening point, thermal expansion coefficient after crystallization, the content of ZnO is preferably 1-4.5 mol %, and more preferably 2.5-4.5 mol %.

Though it is not an essential ingredient of the present invention, $Al_2O_3$ is an ingredient which improves glass forming property and is usable to adjust the crystallization starting temperature, and therefore, may be contained. When contained, the content of it is preferably not more than 4 mol %, for if its content exceeds 4 mol %, precipitation of high thermal expansion crystals might be inhibited.

Although $Y_2O_3$, $Yb_2O_3$ and $CeO_2$ are not essential ingredients in the composition of the present invention, they are such ingredients that serve to maintain adhesion strength, and thus one or more of them may be contained. However, if their total content exceeds 2 mol %, a glass phase would be left at too much a proportion after firing of the composition in powder form, which is undesirable. Therefore, if $Y_2O_3$, $Yb_2O_3$ and $CeO_2$ are contained, their total content is preferably not more than 2 mol %.

Though $TiO_2$ and $ZrO_2$ are not essential ingredient of the present invention, they are ingredients that promote precipitation of crystals and improve weather resistance of the glass, and one of both of them may be contained. However, if the total content of $TiO_2$ and $ZrO_2$ exceeds 2 mol %, they might remain undissolved in the melt during glass production, or lower flowability during firing of the composition in powder form. Therefore, if contained, their total content is preferably not more than 2 mol %.

In addition to the ingredients mentioned above, one or more compounds selected from $Fe_2O_3$, CuO, CoO, and NiO may be added in an total amount of not more than 2 mol % in order to improve the stability of the glass during production, suppress reactions with metals, improve adhesiveness of the seal provided using the glass composition of the present invention to metals, and adjust the kinds and their mutual proportions of crystals precipitating during firing of the composition of the present invention.

In contrast to the ingredients mentioned above that may be contained in the sealing glass composition of the present invention, $B_2O_3$ could vaporize from the seal and contaminate electrodes while SOFC or sensors sealed with the fired composition containing it are kept at high temperatures, although $B_2O_3$ helps to stabilize the glass state during the process of glass production. Therefore, it is preferable that the sealing glass composition of the present invention is substantially free of $B_2O_3$.

It is also preferred that sealing glass composition of the present invention is substantially free of alkali metal oxides such as $Na_2O$ and $K_2O$, for their reaction with metals is tend to be promoted at high temperatures.

Besides, if the glass composition of the present invention containing CaO and MgO further contains BaO, insufficient crystallization of the glass composition by firing tends to occur, because it makes the glass state more likely stabilized and thereby leads to increased crystallization temperature, which hinders crystallization from taking place. Therefore, it is preferred that the glass composition of the present invention is substantially free of BaO.

Herein, the phrase "substantially free of" used in connection to above mentioned components is not meant to prohibit their content at contaminant levels. For example, if their content is at levels of mere contaminants in the raw materials for glass production, they may be contained. More specifically, if their total content does not exceed 3000 ppm calculated as oxides, boron oxide, alkali metal oxides, and barium oxide do not actually cause problems, and therefore the composition is deemed to be "substantially free of" them in the present invention.

It is required that a glass powder consisting of the glass composition of the present invention exhibit high flowability when fired, because in its application to sealing, it must wet the surfaces of a metal and a ceramic while once shrinking, softening and then flowing during firing. For this, it is preferable to adjust pulverization conditions so that its mean particle size comes to 2-10 μm, and its maximum particle size to 150 μm or less. Herein, the term "mean particle size" indicates the median diameter ($D_{50}$ value) obtained using a laser diffraction particle size distribution analyzer operated in the volume distribution mode.

In this regard, a fine powder consisting of particles with excessively small particle sizes is not preferable, for it will start crystallizing too early, which then lowers the composition's flowability during firing of the sealant and hinder its flow, thereby necessitating increased rounds of application and firing of the sealant, and leading to increased production costs. At the same time, a coarse powder consisting of particles of excessively large sizes causes a problem that the particles of the powder settles and separates while the powder is made into a paste or while it is applied and dried, and also a problem that uneven and insufficient crystallization likely occurs, resulting in reduced strength. The particles size can be adjusted by removing such fine or coarse powders through a process of sieving or the like. The mean particle size is preferably not smaller than 2 μm, more preferably not small than 4 μm, and preferably not greater than 25 μm, and more preferably not greater than 15 μm. In addition, the maximum particle size is preferably not greater than 150 μm, and more preferably not greater than 100 μm.

Therefore, they may, for example, be set as follows: the mean particle size of 25 μm and the maximum particle size of not more than 150 μm, the mean particle size of 15 μm and the maximum particle size of not more than 100 μm, the mean particle size of 5 µm and the maximum particle size of not more than 100 µm, or the mean particle size of 3.0 µm and the maximum particle size of 15 µm, and so on.

The sealing glass composition of the present invention may be used to seal a ceramic and a metal, either in the form of glass powder or as a mixture of this and ceramic powder. It is also possible to subject the composition, after mixing it with a molding aid as desired, to dry press molding to form a molded compact (a pressed powder compact), calcine it at a temperature close to the softening point of the glass, and combine it with the above paste.

Furthermore, in order to finely adjust thermal expansiveness, accelerate crystallization of the glass and improve its strength, ceramic filler (ceramic powder) may be added to the glass powder in such an amount as not to lower the flowability of the composition during firing. Addition of a filler in an amount of less than 0.1 wt % of the total amount of the powder is ineffective, while its addition in an amount of more than 10 wt % causes reduction of flowability of the composition and thus hinder its flow during firing for sealing, both of which are undesirable. Thus, the amount to be added is preferably 0.1-10 wt %, more preferably 0.5-5 wt %, and still more preferably 1-3 wt %.

Examples of ceramic fillers include, but are not limited to, alumina, zirconia, preferably partially-stabilized zirconia, magnesia, forsterite, steatite, wollastonite, and barium titanate. The mean particle size of fillers is preferably not more than 20 µm, more preferably not more than 5 µm, and still more preferably not more than 3 µm, and the maximum particle size is not more than 106 µm, more preferably not more than 45 µm, and still more preferably not more than 22 µm.

The sealing glass composition of the present invention may be used, either in the form of powder or as a mixture powder with a ceramic powder, for sealing an object. Such a powders may also be used in various forms, such as paste or sheet.

In the case where the sealing glass composition of the present invention is to be used in paste form, the sealing glass composition may be mixed with at least one solvent and an organic binder to prepare a paste. For example, a paste can be prepared by mixing a powder-form composition of the present invention, a solvent, and an organic binder. While there is no particular limitation to the mean particle size of a powder-form sealing glass composition for preparing a paste, it is preferably 2-25 µm in general, and more preferably 5-15 µm.

There is no particular limitation as to what is used as an organic binder mentioned above, and one can be chosen from publicly known binders, as desired, in accordance with the actual application of the sealing glass composition. Cellulose-based polymers such as ethyl cellulose is named for example, without limitation.

A solvent mentioned above may be selected as desired in accordance with the organic binder employed, and exemplified, without limitation, by organic solvents such as alcohols like ethanol, methanol, isopropanol; terpineol, (α-terpineol, or its mixture with β-terpineol and γ-terpineol where α-terpineol is the main ingredient). Besides, either a single solvent or a combination of two or more solvents may be used.

In preparing a paste, other publicly known additives, as needed, may also be added as desired, such as plasticizers, thickeners, sensitizers, surfactants, dispersants, and the like.

The sealing glass composition of the present invention may be provided in the form of sheet. For this, some of such materials as solvents, organic binders, and the like may be selected as desired, added to a powder-form sealing glass composition of the present invention, mixed, and the mixture then may be applied to a substrate and dried at room temperature or by heating.

An object may be sealed by applying the sealing glass composition of the present invention (in the form of, e.g., powder, mixture powder, paste or sheet) to the surface of the object by printing, or using a dispenser, and firing it at 900-1150° C. Alternatively, the sealing glass composition, blended with a molding aid as desired, may be subjected to dry press molding, the molded compact thus obtained (pressed powder compact) may be calcined at a temperature near the softening point of the glass, applied, in combination with the paste mentioned above, to the surface of the object, and fired. In this case, examples of molding aids for dry press molding that can be used include, but not limited to, polyvinylalcohol.

EXAMPLES

While the present invention is described in further detail below with reference to examples, it is not intended that the present invention be limited to those examples.
(Preparation of Glass and Glass Powder)

Examples 1-36 and Comparative Examples 1-2

Raw materials were weighed and mixed to give the compositions shown in Tables 1-7, and the raw materials thus mixed were put in a platinum crucible and melted at 1400-1500° C. for two hours, and then rapidly cooled to give glass flakes. The glass flakes were put in a pot mill and pulverized until the mean particle size reached 2-10 µm, and then coarse particles were removed using a sieve having the pore size of 106 µm to provide respective glass powders of Examples and Comparative Examples.
(Preparation of Mixture Powder with Fillers)

Examples 37-38

Respective mixture powders were prepared using the glass powder of Examples 1 and 27 and steatite as a filler, according to the mixing ratios shown in Table 8.
(Evaluation)

Each glass powder of Examples 1-36 and Comparative Examples 1-2 was measured for its softening point, peak crystallization temperature, and mean particle size by the methods described below, and made into a pressed powder compact, fired, and measured for its flow diameter as well as for the thermal expansion coefficient of the fired pressed powder compact, and was evaluated, respectively. The mixture powder of Examples 37-38 were also measured for the flow diameter of their pressed powder compact and thermal expansion coefficient.

(1) Softening Point (Ts) and Peak Crystallization Temperature (Tp)

Approximately 40 mg of a glass powder filled in a platinum cell was measured for its softening point (Ts) and peak crystallization temperature (Tp) while raising the temperature starting from room temperature up to 1150° C. at a rate of 20° C./min, on a DTA analyzer (Thermo Plus TG8120, manufactured by Rigaku Corporation). In the case where two or more crystallization peaks were observed, they were designated the first peak crystallization temperature, the second peak crystallization temperature, and the third peak crystallization temperature, counting from the lower temperature side. The results are shown in Tables 1-7.

(2) Mean Particle Size ($D_{50}$) of Glass Powder

Using a laser scattering particle-size distribution analyzer, $D_{50}$ values in the volume distribution mode were determined for each powder of Examples and Comparative Examples. The results are shown in Tables 1-7.

(3) Flow Diameter of Pressed Powder Compact

Each powder of Examples 1-36 and Comparative Examples 1-2, in an amount of 5 g, was put in a 20 mm mold and press molded at 3 MPa for 10 sec to produce a pressed powder compact. Each pressed powder compact was fired at 950° C. for 1 hour, and the diameter of the obtained fired body was measured as the flow diameter (mm). Each pressed powder compact of Examples 1-15, 17-25, and 27-36 was fired also at 1150° C., for 1 hour to prepare a fired body, which was measured for flow diameter, too. In addition, each mixture powder of Examples 37-38 was also measured for flow diameter of its fired body prepared by firing at 950° C. for 1 hour. The results are shown in Tables 1-8.

(4) Thermal Expansion Coefficient

Each fired body obtained in (3) above was cut out in the size of 5×5×15 mm to prepare a test piece. For the test piece, thermal expansion coefficient (a) was determined based on two points of 50° C. and 850° C. on the thermal expansion curve that was produced by raising temperature at a rate of 10° C./min starting from room temperature. The results are shown in Tables 1-8, in [×10$^{-7}$/° C.].

TABLE 1

| Glass Composition | Example 1 mol % | Example 2 mol % | Example 3 mol % | Example 4 mol % | Example 5 mol % | Example 6 mol % |
|---|---|---|---|---|---|---|
| $SiO_2$ | 48.0 | 48.0 | 43.0 | 46.0 | 50.0 | 46.0 |
| CaO | 14.0 | 19.0 | 25.0 | 31.0 | 16.0 | 33.0 |
| MgO | 26.0 | 21.0 | 29.0 | 22.0 | 31.0 | 14.0 |
| $La_2O_3$ | 5.0 | 5.0 | 3.0 | 1.0 | 3.0 | 4.0 |
| ZnO | — | — | — | — | — | — |
| $Al_2O_3$ | 3.0 | 3.0 | — | — | — | 3.0 |
| $Yb_2O_3$ | — | — | — | — | — | — |
| $Y_2O_3$ | 2.0 | — | — | — | — | — |
| $CeO_2$ | — | 2.0 | — | — | — | — |
| $TiO_2$ | — | — | — | — | — | — |
| $ZrO_2$ | 2.0 | 2.0 | — | — | — | — |
| Total | 100.0 | 100.0 | 100.0 | 100.0 | 100.0 | 100.0 |
| Softening point (° C.) | 817 | 813 | 810 | 797 | 803 | 817 |
| 1st Peak crystallization temp. (° C.) | 1019 | 1010 | 912 | 909 | 954 | 957 |
| 2nd Peak crystallization temp. (° C.) | 1100 | — | 988 | 957 | 969 | 1062 |
| 3rd Peak crystallization temp. (° C.) | — | — | — | — | — | — |
| T.E.C.* (50-850° C.) after 950° C., 1 hr treat. | 94 | 97 | 100 | 91 | 93 | 92 |
| Flow diameter (mm) after 950° C., 1 hr treat. | 17.8 | 17.2 | 17.1 | 17.1 | 17.1 | 17.1 |
| T.E.C.* (50-850° C.) after 1050° C., 1 hr treat. | 93 | 97 | 97 | 97 | 95 | 91 |
| Flow diameter (mm) after 1050° C., 1 hr treat. | 17.8 | 17.2 | 17.2 | 17.0 | 17.0 | 17.1 |
| Mean particle size $D_{50}$ (μm) | 5.8 | 4.2 | 9.1 | 9.8 | 7.5 | 9.3 |

*Thermal expansion coefficient: expressed in [×10$^{-7}$/° C.]

TABLE 2

| Glass Composition | Example 7 mol % | Example 8 mol % | Example 9 mol % | Example 10 mol % | Example 11 mol % | Example 12 mol % |
|---|---|---|---|---|---|---|
| $SiO_2$ | 46.0 | 48.0 | 48.0 | 46.0 | 46.0 | 46.0 |
| CaO | 31.0 | 14.0 | 31.0 | 31.0 | 20.0 | 14.0 |
| MgO | 14.0 | 27.0 | 14.0 | 17.0 | 25.0 | 33.0 |
| $La_2O_3$ | 3.0 | 5.0 | 3.0 | 3.0 | 7.0 | 3.0 |
| ZnO | — | — | — | — | 2.0 | 1.0 |
| $Al_2O_3$ | 3.0 | 3.0 | 3.0 | 2.0 | — | 3.0 |
| $Yb_2O_3$ | — | — | — | — | — | — |
| $Y_2O_3$ | 1.0 | 1.0 | 1.0 | — | — | — |
| $CeO_2$ | — | — | — | — | — | — |
| $TiO_2$ | — | — | — | — | — | — |
| $ZrO_2$ | 2.0 | 2.0 | — | 1.0 | — | — |
| Total | 100.0 | 100.0 | 100.0 | 100.0 | 100.0 | 100.0 |
| Softening point (° C.) | 826 | 823 | 822 | 810 | 814 | 807 |
| 1st Peak crystallization temp. (° C.) | 1023 | 1018 | 1009 | 997 | 927 | 933 |
| 2nd Peak crystallization temp. (° C.) | 1091 | 1107 | 1062 | 1059 | 953 | 1063 |
| 3rd Peak crystallization temp. (° C.) | — | — | 1104 | — | — | — |

TABLE 2-continued

| Glass Composition | Example 7 mol % | Example 8 mol % | Example 9 mol % | Example 10 mol % | Example 11 mol % | Example 12 mol % |
|---|---|---|---|---|---|---|
| T.E.C.* (50-850° C.) after 950° C., 1 hr treat. | 97 | 95 | 96 | 97 | 98 | 98 |
| Flow diameter (mm) after 950° C., 1 hr treat. | 17.8 | 17.9 | 17.8 | 17.3 | 17.3 | 17.1 |
| T.E.C.* (50-850° C.) after 1050° C., 1 hr treat. | 88 | 91 | 89 | 96 | 97 | 98 |
| Flow diameter (mm) after 1050° C., 1 hr treat. | 17.4 | 17.4 | 17.8 | 17.8 | 17.1 | 17.1 |
| Mean particle size $D_{50}$ (μm) | 9.1 | 9.3 | 9.1 | 8.7 | 7.2 | 7.7 |

*Thermal expansion coefficient: expressed in [×10$^{-7}$/° C.]

TABLE 3

| Glass Composition | Example 13 mol % | Example 14 mol % | Example 15 mol % | Example 16 mol % | Example 17 mol % | Example 18 mol % |
|---|---|---|---|---|---|---|
| $SiO_2$ | 43.0 | 45.0 | 45.0 | 45.0 | 46.0 | 46.0 |
| CaO | 25.5 | 19.0 | 24.0 | 29.0 | 17.5 | 17.5 |
| MgO | 20.0 | 24.5 | 19.5 | 14.5 | 28.0 | 28.0 |
| $La_2O_3$ | 3.0 | 3.0 | 3.0 | 3.0 | 4.0 | 3.0 |
| ZnO | 4.5 | 4.5 | 4.5 | 4.5 | 2.5 | 2.5 |
| $Al_2O_3$ | 3.0 | 3.0 | 3.0 | 3.0 | 2.0 | 2.0 |
| $Yb_2O_3$ | — | 1.0 | — | 1.0 | — | — |
| $Y_2O_3$ | 1.0 | — | 1.0 | — | — | 1.0 |
| $CeO_2$ | — | — | — | — | — | — |
| $TiO_2$ | — | — | — | — | — | — |
| $ZrO_2$ | — | — | — | — | — | — |
| Total | 100.0 | 100.0 | 100.0 | 100.0 | 100.0 | 100.0 |
| Softening point (° C.) | 787 | 800 | 799 | 799 | 802 | 814 |
| 1st Peak crystallization temp. (° C.) | 987 | 912 | 1022 | 987 | 955 | 1046 |
| 2nd Peak crystallization temp. (° C.) | 1013 | 1050 | — | 1062 | 1023 | — |
| 3rd Peak crystallization temp. (° C.) | 1080 | — | — | — | — | — |
| T.E.C.* (50-850° C.) after 950° C., 1 hr treat. | 96 | 95 | 89 | 94 | 99 | 94 |
| Flow diameter (mm) after 950° C., 1 hr treat. | 17.6 | 17.3 | 17.3 | 17.3 | 17.7 | 17.3 |
| T.E.C.* (50-850° C.) after 1050° C., 1 hr treat. | 96 | 94 | 89 | — | 98 | 93 |
| Flow diameter (mm) after 1050° C., 1 hr treat. | 17.5 | 17.1 | 17.3 | — | 17.4 | 17.2 |
| Mean particle size $D_{50}$ (μm) | 9.5 | 9.2 | 8.2 | 9.9 | 7.3 | 8.1 |

*Thermal expansion coefficient: expressed in [×10$^{-7}$/° C.]

TABLE 4

| Glass Composition | Example 19 mol % | Example 20 mol % | Example 21 mol % | Example 22 mol % | Example 23 mol % | Example 24 mol % |
|---|---|---|---|---|---|---|
| $SiO_2$ | 46.0 | 46.0 | 46.0 | 46.0 | 46.0 | 46.0 |
| CaO | 28.0 | 12.0 | 16.0 | 24.5 | 28.0 | 31.0 |
| MgO | 17.5 | 31.0 | 28.0 | 19.5 | 16.0 | 12.0 |
| $La_2O_3$ | 3.0 | 3.0 | 3.0 | 3.0 | 3.0 | 3.0 |
| ZnO | 2.5 | 3.0 | 3.0 | 4.0 | 3.0 | 4.0 |
| $Al_2O_3$ | 2.0 | 4.0 | 3.0 | 2.0 | 3.0 | 3.0 |
| $Yb_2O_3$ | — | — | — | — | — | — |
| $Y_2O_3$ | 1.0 | 1.00 | 1.0 | 1.0 | 1.0 | 1.0 |
| $CeO_2$ | — | — | — | — | — | — |
| $TiO_2$ | — | — | — | — | — | — |
| $ZrO_2$ | — | — | — | — | — | — |
| Total | 100.0 | 100.0 | 100.0 | 100.0 | 100.0 | 100.0 |
| Softening point (° C.) | 802 | 817 | 814 | 797 | 807 | 809 |
| 1st Peak crystallization temp. (° C.) | 1008 | 914 | 927 | 1015 | 1003 | 945 |

TABLE 4-continued

| Glass Composition | Example 19 mol % | Example 20 mol % | Example 21 mol % | Example 22 mol % | Example 23 mol % | Example 24 mol % |
|---|---|---|---|---|---|---|
| 2nd Peak crystallization temp. (° C.) | 1075 | 962 | 966 | 1067 | 1071 | 1060 |
| 3rd Peak crystallization temp. (° C.) | — | 1099 | 1071 | — | — | — |
| T.E.C.* (50-850° C.) after 950° C., 1 hr treat. | 98 | 94 | 93 | 106 | 94 | 94 |
| Flow diameter (mm) after 950° C., 1 hr treat. | 17.2 | 17.2 | 17.3 | 17.3 | 17.5 | 17.2 |
| T.E.C.* (50-850° C.) after 1050° C., 1 hr treat. | 99 | 91 | 93 | 99 | 93 | 95 |
| Flow diameter (mm) after 1050° C., 1 hr treat. | 17.3 | 17.1 | 17.2 | 17.3 | 17.5 | 17.0 |
| Mean particle size $D_{50}$ (μm) | 9.7 | 9.8 | 9.2 | 7.2 | 9.6 | 9.8 |

*Thermal expansion coefficient: expressed in [$\times 10^{-7}$/° C.]

TABLE 5

| Glass Composition | Example 25 mol % | Example 26 mol % | Example 27 mol % | Example 28 mol % | Example 29 mol % | Example 30 mol % |
|---|---|---|---|---|---|---|
| $SiO_2$ | 46.0 | 50.0 | 46.0 | 46.0 | 46.0 | 46.0 |
| CaO | 31.0 | 22.0 | 12.0 | 21.0 | 14.0 | 27.0 |
| MgO | 12.0 | 17.0 | 28.0 | 20.0 | 26.0 | 13.5 |
| $La_2O_3$ | 3.0 | 3.0 | 5.0 | 3.0 | 5.0 | 3.0 |
| ZnO | 3.0 | 4.0 | 3.0 | 4.0 | 3.0 | 4.5 |
| $Al_2O_3$ | 4.0 | 3.0 | 3.0 | 3.0 | 3.0 | 3.0 |
| $Yb_2O_3$ | — | — | — | 1.0 | — | — |
| $Y_2O_3$ | 1.0 | 1.0 | 1.0 | — | 1.0 | 1.0 |
| $CeO_2$ | — | — | — | — | — | — |
| $TiO_2$ | — | — | — | 2.0 | — | — |
| $ZrO_2$ | — | — | 2.0 | — | 2.0 | 2.0 |
| Total | 100.0 | 100.0 | 100.0 | 100.0 | 100.0 | 100.0 |
| Softening point (° C.) | 827 | 815 | 835 | 800 | 815 | 811 |
| 1st Peak crystallization temp. (° C.) | 1005 | 1001 | 966 | 1017 | 953 | 1016 |
| 2nd Peak crystallization temp. (° C.) | 1086 | — | — | — | 1004 | 1091 |
| 3rd Peak crystallization temp. (° C.) | — | — | — | — | 1085 | — |
| T.E.C.* (50-850° C.) after 950° C., 1 hr treat. | 86 | 89 | 97 | 96 | 95 | 92 |
| Flow diameter (mm) after 950° C., 1 hr treat. | 17.5 | 17.5 | 17.5 | 18.2 | 17.2 | 17.8 |
| T.E.C.* (50-850° C.) after 1050° C., 1 hr treat. | 89 | — | 94 | 95 | 91 | 92 |
| Flow diameter (mm) after 1050° C., 1 hr treat. | 17.2 | — | 17.3 | 18.2 | 17.1 | 18.1 |
| Mean particle size $D_{50}$ (μm) | 9.2 | 9.0 | 9.4 | 6.4 | 8.1 | 8.5 |

*Thermal expansion coefficient: expressed in [$\times 10^{-7}$/° C.]

TABLE 6

| Glass Composition | Example 31 mol % | Example 21 mol % | Example 33 mol % | Example 34 mol % | Example 35 mol % | Example 36 mol % |
|---|---|---|---|---|---|---|
| $SiO_2$ | 46.0 | 46.0 | 46.0 | 48.0 | 48.0 | 53.0 |
| CaO | 27.0 | 28.0 | 28.0 | 14.0 | 12.0 | 18.0 |
| MgO | 14.0 | 14.0 | 14.0 | 24.0 | 29.0 | 17.0 |
| $La_2O_3$ | 3.0 | 3.0 | 3.0 | 5.0 | 3.0 | 3.0 |
| ZnO | 3.0 | 3.0 | 3.0 | 3.0 | 3.0 | 4.0 |
| $Al_2O_3$ | 4.0 | 3.0 | 3.0 | 3.0 | 4.0 | 3.0 |
| $Yb_2O_3$ | — | — | — | — | — | — |
| $Y_2O_3$ | 1.0 | 1.0 | 1.0 | 1.0 | 1.0 | 1.0 |
| $CeO_2$ | — | — | — | — | — | — |
| $TiO_2$ | — | 2.0 | — | — | — | — |
| $ZrO_2$ | 2.0 | — | 2.0 | 2.0 | — | 1.0 |
| Total | 100.0 | 100.0 | 100.0 | 100.0 | 100.0 | 100.0 |

TABLE 6-continued

| Glass Composition | Example 31 mol % | Example 21 mol % | Example 33 mol % | Example 34 mol % | Example 35 mol % | Example 36 mol % |
|---|---|---|---|---|---|---|
| Softening point (° C.) | 752 | 811 | 829 | 828 | 827 | 802 |
| 1st Peak crystallization temp. (° C.) | 1034 | 1021 | 1033 | 1017 | 972 | 1024 |
| 2nd Peak crystallization temp. (° C.) | 1116 | 1067 | 1096 | 1100 | 1088 | — |
| 3rd Peak crystallization temp. (° C.) | — | — | — | — | — | — |
| T.E.C.* (50-850° C.) after 950° C., 1 hr treat. | 103 | 92 | 96 | 92 | 98 | 91 |
| Flow diameter (mm) after 950° C., 1 hr treat. | 18.0 | 18.0 | 18.1 | 17.8 | 17.7 | 18.2 |
| T.E.C.* (50-850° C.) after 1050° C., 1 hr treat. | 93 | 92 | 93 | 90 | 96 | 91 |
| Flow diameter (mm) after 1050° C., 1 hr treat. | 18.2 | 17.7 | 17.8 | 18.0 | 17.8 | 17.8 |
| Mean particle size $D_{50}$ (μm) | 8.3 | 9.0 | 8.6 | 9.5 | 9.7 | 8.4 |

*Thermal expansion coefficient: expressed in [×$10^{-7}$/° C.]

TABLE 7

| Glass Composition | Comparative Example 1 mol % | Comparative Example 2 mol % |
|---|---|---|
| $SiO_2$ | 47.0 | 40.0 |
| CaO | 12.5 | 15.0 |
| MgO | 4.5 | 15.0 |
| $La_2O_3$ | 3.0 | — |
| ZnO | 31.0 | 10.0 |
| $Al_2O_3$ | 1.0 | 5.0 |
| $Yb_2O_3$ | — | — |
| $Y_2O_3$ | 1.0 | — |
| $CeO_2$ | — | — |
| $TiO_2$ | — | — |
| $ZrO_2$ | — | — |
| BaO | — | 15.0 |
| Total | 100.0 | 100.0 |
| Softening point (° C.) | 734 | 758 |
| 1st Peak crystallization temp. (° C.) | 851 | 875 |
| T.E.C.* (50-850° C.) after 950° C., 1 hr treat. | 57 | 122 |
| Flow diameter (mm) after 950° C., 1 hr treat. | 17.3 | 16.8 |
| Mean particle size $D_{50}$ (μm) | 5.2 | 5.5 |

*Thermal expansion coefficient: expressed in [×$10^{-7}$/° C.]

TABLE 8

| | Example 37 | Example 38 |
|---|---|---|
| Glass:Filler (wt %) | 93:7 | 95:5 |
| Glass | Example 1 | Example 27 |
| Filler | Steatite | Steatite |
| T.E.C.* (50-850° C.) | 99 | 98 |
| Flow diameter | 18.8 | 17.6 |

*Thermal expansion coefficient: expressed in [×$10^{-7}$/° C.]

As shown in in Tables 1-6, it is observed that all the fired bodies produced by firing at 950° C. of the pressed powder compacts made of the powder of glass compositions of Examples 1-36 exhibit a thermal expansion coefficient falling within the range of 80-110×$10^{-7}$/° C. as determined in the range of 50-850° C. Further, in Examples 1-15, 17-25, and 27-36, the fired bodies produced by firing at 1150° C. also exhibit a thermal expansion coefficient falling within the same range. In contrast, the thermal expansion coefficient of the fired bodies produced by firing at 950° C. of the pressed powder compact of the glass compositions of Comparative Examples 1-2, exhibited 57×$10^{-7}$/° C. and 122×$10^{-7}$/° C. as determined in the range of 50-850° C., both showing a great departure from the above range.

INDUSTRIAL APPLICABILITY

The glass composition according to the present invention has a capacity to turn into crystallized glass and seal between metals, a metal and a ceramic, and ceramics, and therefore, can be used advantageously as a sealant for instruments used in an environment where they are exposed to high temperatures like 700-1050° C., such as solid oxide fuel cells (SOFC) and temperature sensors.

The invention claimed is:
1. A sealing glass composition substantially free of both boron oxide and barium oxide, comprising

| $SiO_2$ | 43-53 mol %, |
|---|---|
| CaO | 12-33 mol %, |
| MgO | 12-33 mol %, |
| $Al_2O_3$ | not more than 4 mol %, |
| $La_2O_3$ | 1-7 mol %, and |
| ZnO | 0-4.5 mol %, | wherein the composition turns, when fired at a temperature of 900-1150° C., into a crystallized glass having a thermal expansion coefficient of 80-110×$10^{-7}$/° C. at a temperature in the range of 50-850° C.

2. A sealing glass composition substantially free of both boron oxide and barium oxide, comprising

| $SiO_2$ | 43-53 mol %, |
|---|---|
| CaO | 12-31 mol %, |
| MgO | 12-31 mol %, |
| $La_2O_3$ | 3-5 mol %, and |
| ZnO | 1-4.5 mol %, | wherein the composition turns, when fired at a temperature of 900-1150° C., into a crystallized glass having a thermal expansion coefficient of 80-110×$10^{-7}$/° C. at a temperature in the range of 50-850° C.

3. The sealing glass composition substantially free of both boron oxide and barium oxide according to claim 2, comprising

| | |
|---|---|
| SiO$_2$ | 45-50 mol %, |
| CaO | 12-31 mol %, |
| MgO | 12-31 mol %, |
| La$_2$O$_3$ | 3-5 mol %, and |
| ZnO | 2.5-4.5 mol %, | wherein the composition turns, when fired at a temperature of 900-1150° C., into a crystallized glass having a thermal expansion coefficient of 80-110×10$^{-7}$/° C. at a temperature in the range of 50-850° C.

4. The sealing glass composition according to claim 2, further comprising Al$_2$O$_3$ at not more than 4 mol %.

5. The sealing glass composition according to claim 1, further comprising one of more compounds selected from the group consisting of Y$_2$O$_3$, Yb$_2$O$_3$, and CeO$_2$ in their total amount of not more than 2 mol %.

6. The sealing glass composition according to claim 1, further comprising one more of compounds selected from the group consisting of TiO$_2$ and ZrO$_2$ in their total amount of not more than 2 mol %.

7. The sealing glass composition according to claim 1, in the form of powder.

8. The sealing glass composition according to claim 7, wherein the mean particle size of the powder is 2-10 μm.

9. The sealing glass composition according to claim 7, further comprising a ceramic filler.

10. The sealing glass composition consisting of a pressed powder compact of the powder according to claim 7.

11. The sealing glass composition according to claim 7, containing a solvent and an organic binder, and in the form of paste or sheet.

12. Solid oxide fuel cells sealed with a fired body of the sealing glass composition according to claim 7.

13. A method of producing a sealing glass composition, wherein the composition turns, when fired in the form of powder at a temperature of 900-1150° C., into a crystallized glass exhibiting a thermal expansion coefficient of 80-110×10$^{-7}$/° C. at a temperature in the range of 50-850° C., and the composition is substantially free of both boron oxide and barium oxide wherein the method comprises providing and mixing raw materials comprising:

| | |
|---|---|
| SiO$_2$ | 43-53 mol %, |
| CaO | 12-33 mol %, |
| MgO | 12-33 mol %, |
| Al$_2$O$_3$ | not more than 4 mol %, |
| La$_2$O$_3$ | 1-7 mol %, and |
| ZnO | 0-4.5 mol %, and | heating the raw materials into a melt, and cooling the melt to let the melt solidify.

* * * * *